United States Patent
Brahmbhatt et al.

[11] Patent Number: 5,611,833
[45] Date of Patent: Mar. 18, 1997

[54] METHOD AND APPARATUS FOR PRODUCING SPHEROIDAL GLASS PARTICLES

[75] Inventors: Sudhir R. Brahmbhatt, Glencoe; Christopher R. Young, St. Charles, both of Mo.

[73] Assignee: MG Industries, Malvern, Pa.

[21] Appl. No.: 229,215

[22] Filed: Apr. 18, 1994

Related U.S. Application Data

[63] Continuation-in-part of Ser. No. 115,665, Sep. 2, 1993, abandoned, which is a continuation of Ser. No. 935,395, Aug. 26, 1992, abandoned.

[51] Int. Cl.$^6$ ................................................ C03B 19/10
[52] U.S. Cl. ..................... 65/21.3; 65/29.12; 65/29.15; 65/29.19; 65/142; 65/158; 264/15
[58] Field of Search ........................... 65/21.1, 21.2, 65/21.3, 21.4, 29.12, 29.13, 29.15, 29.18, 29.19, 104, 120, 142, 158, 160, 162, 284; 264/15

[56] References Cited

U.S. PATENT DOCUMENTS

| | | | |
|---|---|---|---|
| 2,524,613 | 10/1950 | Wainer | 65/21.3 |
| 2,676,892 | 4/1954 | McLaughlin | 65/21.4 |
| 2,794,301 | 6/1957 | Law et al. | 65/21.3 |
| 3,129,086 | 4/1964 | Veatch et al. | 65/142 |
| 3,230,064 | 1/1966 | Veatch et al. | 65/142 |
| 3,272,615 | 9/1966 | Hoffman et al. | 65/21.3 |
| 4,046,548 | 9/1977 | Wood et al. | 65/142 |
| 4,113,915 | 9/1978 | Schott | 65/21.2 |
| 4,385,917 | 5/1983 | Aston et al. | 65/21.3 |
| 4,475,936 | 10/1984 | Aston et al. | 65/21.3 |
| 4,487,620 | 12/1984 | Neusy | 65/21.3 |
| 4,643,753 | 2/1987 | Braun | 65/21.3 |
| 4,661,137 | 4/1987 | Garnier et al. | 65/21.4 |
| 4,816,067 | 3/1989 | Kopatz | 65/21.3 |
| 4,961,770 | 10/1990 | Johnson et al. | 65/21.3 |
| 5,039,326 | 8/1991 | Day et al. | 65/21.1 |

FOREIGN PATENT DOCUMENTS

| | | | |
|---|---|---|---|
| 63-236721 | 10/1988 | Japan | 65/21.3 |
| 740145 | 11/1955 | United Kingdom . | |

Primary Examiner—Donald E. Czaja
Assistant Examiner—Steven P. Griffin
Attorney, Agent, or Firm—William H. Eilberg

[57] ABSTRACT

One forms spherical or spheroidal glass particles by entraining a powder of glass particles in a carrier gas and injecting the entrained particles into the center of the flame of an oxygen-fuel burner. Separate conduits carry fuel, such as natural gas, and substantially pure oxygen into the burner to support combustion. The temperature in the burner flame does not exceed about 5000° F. Heat from the flame causes the particles to become spheroidal, due to surface tension, but the particles do not remain in the flame long enough to melt. By adjusting a valve in the line which conveys the carrier gas and glass particles, one varies the time during which the particles reside in the flame. If the pressure becomes too high, the residence time decreases, and the particles may not become entirely spheroidal. If the pressure becomes too low, the residence time increases, and the particles may melt and/or form undesirable filaments. One can retrieve the product particles from the bottom of the burner chamber, and also by filtering the exhaust gases to recover particles entrained by the exhaust. The oxygen used to support combustion can also be used as a carrier gas. The invention also includes an apparatus for automatically regulating the flow of oxygen and fuel, so as to maintain both the desired flame temperature and the optimal ratio of oxygen to fuel.

13 Claims, 1 Drawing Sheet

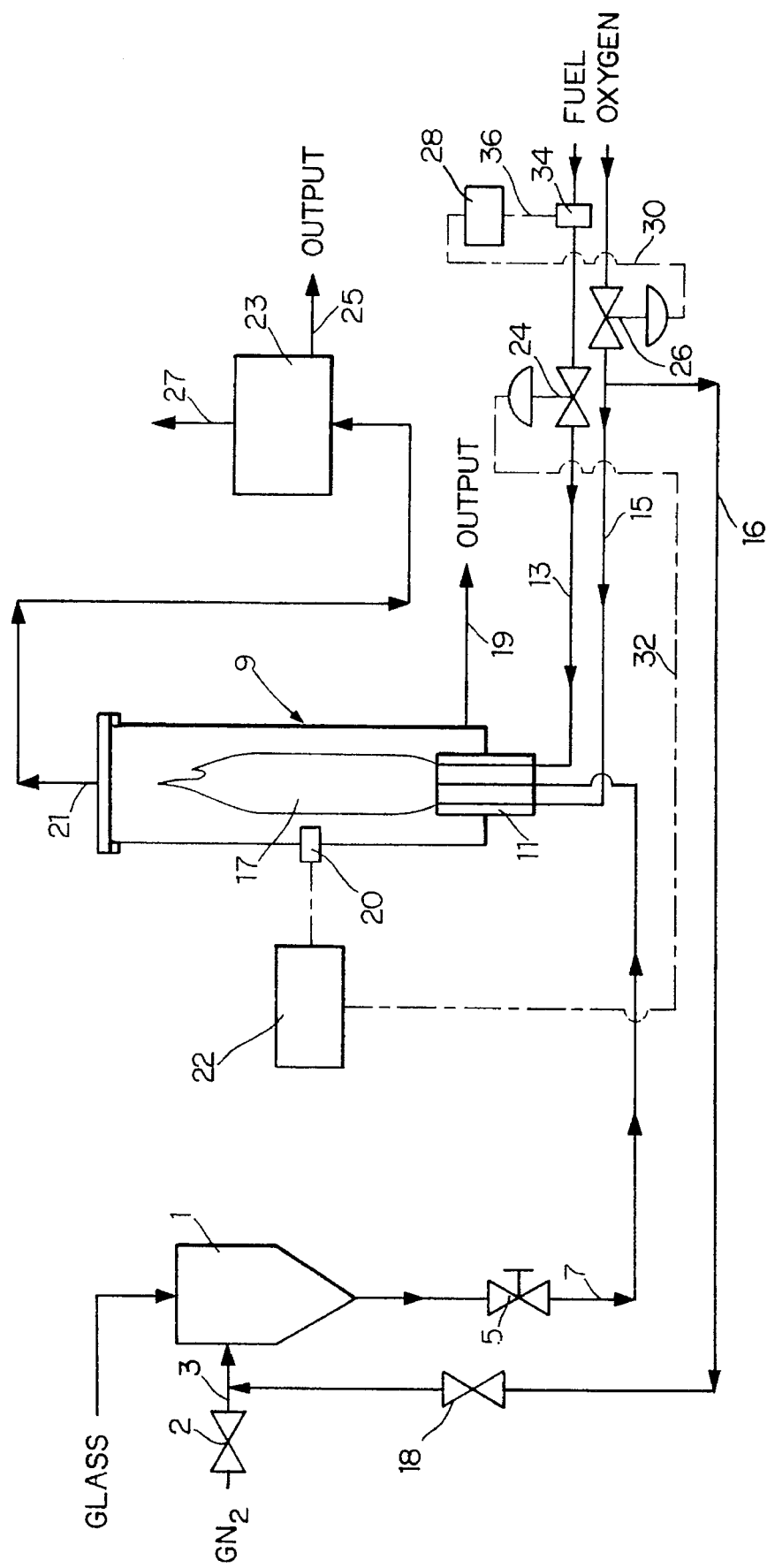

METHOD AND APPARATUS FOR PRODUCING SPHEROIDAL GLASS PARTICLES

CROSS-REFERENCE TO PRIOR APPLICATION

This is a Continuation-in-Part of U.S. patent application Ser. No. 08/115,665, filed Sep. 2, 1993, now abandoned, which is a continuation of Ser. No. 07/935,395, filed Aug. 26, 1992, now abandoned.

BACKGROUND OF THE INVENTION

This invention relates to the field of production of powders containing generally spheroidal glass particles. One can use such powders as fillers for epoxy resins used in the manufacture of electronic components.

The electronics industry has used glass powders, and especially powders of fused silica ($SiO_2$) in the manufacture of printed circuit boards and electronic components. An integrated circuit typically comes packed in a housing made of epoxy resin. Fused silica or other glasses form fillers for the epoxy resin. Up to 80% of a typical package which houses an integrated circuit may include fused silica.

Usually the fused silica or other glass powder contains particles having a diameter in the range of about 2–150 microns. The particles usually have rough edges, and have a non-spheroidal, several advantages result. First, if the particles have a spheroidal shape, the powder has a smaller total surface area, and one can pack the particles together more effectively. As a result, one requires less powder than one would need if the particles had rough edges.

Secondly, a powder composed of spheroidal particles "flows" more easily than a powder made of rough particles. Typically, one uses an injection molding device to shape a mixture of glass particles and epoxy resin. Making the particles spheroidal enables the mixture to pass through the molding device more easily. Since one can handle the mixture more readily, the manufacturing cost of the electronic circuit decreases.

Moreover, it turns out that the spheroidal shape of the particles contributes to the overall strength of the product, because of the tendency of spheroidal particles to become well-packed together.

While the prior art has recognized the desirability of producing spherical or spheroidal particles of glass, the methods of the prior art have not proved economical. For example, U.S. Pat. No. 4,961,770 shows a process for making spherical glass particles by heating the particles in a plasma reactor, at temperatures in the range of 5500° C. to 17000° C. While the patented process apparently works to produce the desired result, it operates at such high temperatures as to make the process uneconomical.

The present invention provides a method and apparatus which greatly reduces the cost of producing spheroidal glass particles. The apparatus of the present invention uses a slightly modified form of an oxygen-fuel burner, and operates at temperatures of only about 5000° F. or less.

SUMMARY OF THE INVENTION

In the method of the present invention, one begins with a powder of glass particles, the particles having an average diameter in the range of about 2–150 microns. A carrier gas, such as nitrogen, directs the powder to a burner. The burner has the form of an oxygen-fuel burner, in which fuel and pure oxygen enter the burner through separate conduits. The powder, entrained in the carrier gas, enters the burner through a tube located at or near the center of the burner, so that it enters the burner at the center of the burner flame. By varying the pressure of the carrier gas, one can vary the time spent by the particles inside the burner. A lower gas pressure increases the residence time, and a higher gas pressure reduces the residence time. In general, one wants to keep the particles in the hottest portion of the flame long enough for them to become spherical, by the action of surface tension, but not long enough to allow them to melt.

One can collect the spheroidal particles both from the bottom of the chamber which houses the burner, and from an upper vent of the chamber. Some of the particles fall towards the bottom of the chamber, while other particles exit the upper vent and travel with the exhaust gases of combustion. The exhaust gases, and some of the particles, become cooled in the exit conduit, or in a separate cooling means connected to the exit conduit, and then pass through a filter which recovers the glass particles while allowing the clean gas to escape.

The apparatus of the present invention includes a modified oxygen-fuel burner. The burner has a cylindrical burner structure, into which one directs separate conduits for the fuel, the oxygen, and the entrained glass particles. The conduit carrying the glass particles sits at or near the center of the burner. A combustion chamber surrounds the burner, and the particles pass through their conduit and into the chamber. An opening at the top of the chamber provides a vent for exhaust gas; some of the glass particles also pass through this vent, as noted above. An opening near the bottom of the chamber provides a point from which one can extract the processed product.

The apparatus also includes means for feeding the powder to the burner at a controlled rate. One stores the powder in a feeder, and applies gaseous nitrogen, or some other carrier gas, to move the powder through the system. A valve in the line controls the pressure of the carrier gas, thereby controlling the residence time of the particles in the burner flame. The oxygen used to support combustion can also be used as a carrier gas, either in addition to or instead of nitrogen.

The present invention also includes automatic means for regulating the temperature of the flame, and for maintaining the optimal ratio of oxygen to fuel. Such means includes an ultraviolet sensor directed towards the flame, the sensor being connected to a controller which operates a valve in the fuel line. The regulating means also includes a controller which varies the setting of a valve in the oxygen line, in response to the measured rate of fuel flow, so as to maintain the optimal ratio of oxygen to fuel.

The present invention therefore has the primary object of making a powder of spheroidal or spherical glass particles.

The invention has the further object of converting a glass powder having generally rough-edged particles into a powder having primarily spheroidal or spherical particles.

The present invention has the further object of increasing the efficiency of manufacture of spheroidal glass particles.

The present invention has the further object of reducing the amount of glass filler needed in an epoxy resin.

The invention has the further object of making it easier to handle mixtures of epoxy resin and glass filler.

The invention has the further object of providing an apparatus for making glass powder having substantially spherical particles.

The invention has the further object of providing an apparatus as described above, wherein the apparatus comprises a modified form of a conventional oxygen-fuel burner.

The invention has the further object of reducing the cost of making glass powders having spherical or spheroidal particles.

The person skilled in the art will recognize other objects and advantages of the invention, from a reading of the following brief description of the drawings, the detailed description of the invention, and the appended claims.

BRIEF DESCRIPTION OF THE DRAWING

The FIGURE shows a schematic and block diagram of the apparatus made according to the present invention.

DETAILED DESCRIPTION OF THE INVENTION

The FIGURE shows the apparatus of the present invention, and also illustrates the process of making the spherical or spheroidal glass particles.

The process begins by placing the glass particles into feeder 1. Preferably the particles comprise a powder of coarse fused silica ($SiO_2$). Such fused silica has the appearance of a white powder. The term "glass" describes the powder generically; in general, "glass" includes silicas which also contain various impurities. This specification uses the term "glass" to emphasize that one could use either fused silica or any other related glassy substance.

One can practice the present invention with powders composed of particles having a diameter of about 2–150 microns. The invention may also work with particles having a diameter greater than 150 microns.

Gaseous nitrogen enters the system through supply line 3 which includes valve 2. The gaseous nitrogen acts as a carrier for the powder. One can use other gases instead of nitrogen. Nitrogen has the advantage that it is easily available, relatively inexpensive, free of impurities, and relatively inert. Other inert or relatively inert gases can act as the carrier gas.

The pressure of the carrier gas preferably falls within the range of about 2–10 psig. Valve 5 adjusts the pressure in line 7. As explained in more detail below, varying the pressure in the line affects the quality of the final product.

The apparatus includes chamber 9 having a generally cylindrical shape, as shown. Near the bottom of the chamber sits burner 11 which also has a generally cylindrical shape. The conduit defined by line 7 enters the burner, preferably at or near the center of the burner structure. If the particles entered at an off-center position, they would tend to become pushed farther away from the center by the pressure of the flame, and their effective residence time in the flame would not suffice to make them spheroidal.

Fuel line 13 enters burner 11 at an off-center position, as does oxygen line 15. As a fuel one can use natural gas, acetylene, propane, or other fuel. Oxygen line 15 contains substantially pure oxygen, so as to burn the fuel with maximum efficiency.

One starts the combustion in a conventional manner, such as by using a spark plug, or a pilot light, or equivalent. Flame 17 begins at the tip of burner 11, where the conduits leading to the burner (containing particles, fuel, and oxygen) all terminate. The flame includes a primary flame, located immediately adjacent to the burner tip, and a secondary flame, located around the primary flame. The primary flame has the greater temperature. For natural gas, the temperature in the hottest part of the flame (the so-called "flame temperature" stands at about 5000° F., or less. The choice of fuel largely determines the temperature of the flame. Other fuels can produce somewhat higher or lower flame temperatures.

The particles of glass, entrained in the carrier gas, pass from conduit 7 into the flame, at the center of the flame, due to the position of the conduit within burner 11. The heat of the flame causes the particles to become spherical or spheroidal, because of the effect of surface tension, while still generally maintaining their original sizes. But the particles do not stay within the flame long enough to melt. That is, the particles do not turn into a liquid that can be poured. Moreover, the heat generated within the burner will not suffice to melt the particles unless they stay too long within the burner. Instead, the particles merely become softened by the heat in the burner, and readily assume a spheroidal shape due to surface tension.

The amount of melting that is permitted is a function of the heat required to cause the particles to fuse together. Fusion of the particles is undesirable, because particles that fuse together form agglomerations which prevent the glass material from "flowing" smoothly through an injection molding apparatus. Thus, in practicing the present invention, the particles must not be heated sufficiently to cause fusion. In short, the particles should be softened by the heat of the flame, sufficiently to allow them to become spheroidal due to surface tension, but not so much that they can fuse to each other.

The particles pass through the burner and the chamber with relatively high velocity, due to the pressure of the carrier gas.

Note also that the particles are directed upward from the bottom of the chamber. The pressure of the carrier gas tends to force the particles upward, while gravity tends to urge them downward. It is an important feature of the invention that the particles be urged upward, against the force of gravity, because such an arrangement permits greater control over the residence time of the particles in the chamber.

Chamber 9 has an outlet at the bottom, designated by arrow 19, and a vent at the top, designated by arrow 21. Some of the glass particles have greater velocity than others. Those having lower velocity tend to fall, due to gravity, to the bottom of the chamber, where one can collect them as indicated at arrow 19. Those having higher velocity may exit at the vent indicated by arrow 21, together with the exhaust gases of combustion. One can cool the exhaust stream by an additional cooling means (not shown) disposed in the exhaust line, as the exhaust gas travels towards filter 23. (One could alternatively consider the block which represents the filter to include a cooling means.) By passing the stream through the filter, one can recover the spheroidal particles, through outlet 25, and can vent the clean exhaust gas through outlet 27. Thus, one obtains the final product at two locations within the apparatus, namely the bottom of chamber 9 and the exhaust filter. Filtering the exhaust increases the efficiency of the process by recovering particles that otherwise would become lost in the exhaust stream.

Oxygen line 15 branches into conduit 16 which directs oxygen through valve 18 and into supply line 3. Conduit 16 therefore comprises means for diverting oxygen from an oxygen source (not shown) to supply line 3 which delivers the carrier gas to the feeder. Valve 18 is preferably continuously adjustable, so that the flow of oxygen through conduit 16 can be controlled as desired. Valve 2 is also preferably continuously adjustable. With this arrangement, the oxygen used to support combustion can also be used as a carrier gas. Although it is preferable to use either one gas or the other as the carrier gas, the invention includes the possibility of using any combination of gases. Thus, the oxygen could be used either in addition to, or instead of, the nitrogen. The relative amounts of nitrogen and oxygen that are used as a carrier gas can be controlled by adjusting the settings of valves 2 and 18.

To the extent that oxygen is used as the carrier gas, that oxygen enters chamber 9 through line 7, with the glass particles. When it reaches the chamber, it is indistinguishable from the oxygen coming directly from oxygen line 15.

It is important that the fuel and oxygen be provided in the correct stoichiometric ratio to enable complete combustion. If too much oxygen is present, the excess oxygen is wasted. If insufficient oxygen is used, the flame will leave hydrocarbon residues, due to the incomplete combustion. In the case of natural gas, the correct oxygen to fuel ratio is 2:1. For other fuels, the ratio would be different.

The present invention also includes means for automatically controlling the ratio of oxygen to fuel supplied to the burner. An ultraviolet sensor 20 is mounted in the chamber so as to detect the ultraviolet radiation emitted by flame 17. In general, the greater the flame temperature, the greater the intensity of ultraviolet radiation detected by sensor 20. While other kinds of sensors could be used, an ultraviolet sensor is preferred because it responds to the temperature at the inside of the flame. Also, for flame temperatures at about 5000° F., the radiation produced by the flame does not generally fall within the visible spectrum. The sensor is connected to controller 22 which, through control line 32, controls valve 24 disposed in fuel line 13.

A ratio controller 28 is connected to flow meter 34, disposed in fuel line 13, and to valve 26, disposed in oxygen line 15. Control line 36 symbolizes the connection of the flow meter to the ratio controller; control line 30 represents the connection of the ratio controller to valve 26. The ratio controller can be a programmable device which automatically calculates the required flow rate of oxygen based on the measured flow rate of fuel, to achieve the ideal stoichiometric oxygen/fuel ratio. The ratio controller can be a microprocessor, or it can be an equivalent electromechanical device. The ratio controller is programmed with a predetermined ratio of oxygen to fuel, and operates substantially continuously to maintain that desired ratio.

In operation, the sensor 20 causes controller 22 to vary the setting of valve 24 to increase or decrease the flow of fuel to the burner. In general, when the flame temperature is too low, valve 24 is moved towards the "open" position, and when the flame temperature is too high, valve 24 is moved towards the "closed" position. However, simply changing the setting of valve 24 will change the oxygen/fuel ratio, and will make that ratio non-optimal. Thus, substantially simultaneously with the operation of the other components, the ratio controller operates valve 26 so as to maintain the desired flow rate of oxygen, based on the measured flow rate of fuel.

Note that the oxygen line branches into conduit 16 after the oxygen has passed through valve 26. Thus, valve 26 truly controls the total flow of oxygen to the burner, regardless of whether some of that oxygen is also used as a carrier gas.

The present invention has many advantages over the methods and devices of the prior art, as enumerated below:

a) The present invention does not require unusually high temperatures to operate. In comparison with the temperatures of 5,500°–17,000° C. mentioned in U.S. Pat. No. 4,961,770, which translates to a range of 9,932°–30,632° F., the flame used in the present invention has a temperature of about 5000° F. or less. Thus, one can practice the present invention with an oxygen-fuel burner, and one does not require a sophisticated plasma reactor.

b) One can use the present invention with powders having a wide range of particle sizes, from about 2 to about 150 microns. The processes of the prior art generally do not work well for particles having sizes greater than about 25 microns.

c) Because it recovers the glass particles entrained in the exhaust gas vented from the burner chamber, the present invention has a very high efficiency.

d) The present invention uses the pressure of the carrier gas as the primary means of regulating the quality of the particles produced. By decreasing the pressure, one increases residence time of the particles in the flame; by increasing the pressure, one reduces residence time.

e) The apparatus used to practice the present invention includes a modified form of a conventional oxygen-fuel burner as its major component. In particular, one simply provides a conduit at the center of the oxygen-fuel burner, and directs the particles and carrier gas into the flame through that conduit. The present invention does not require expensive equipment such as plasma reactors. One can easily adapt existing equipment to practice the present invention.

f) To support combustion, the present invention uses easily-obtained materials, namely natural gas (or other similar fuels) and pure oxygen. In comparison to a plasma reactor, which uses an enormous amount of electrical energy to form the plasma, the present invention consumes relatively little energy.

g) The process of the present invention does not form filaments, because the temperatures do not suffice to cause the particles to agglomerate or to melt.

h) The present invention provides automated means for regulating the flow of fuel and oxygen, thereby automatically maintaining both the desired flame temperature and the optimal ratio of oxygen to fuel.

i) The present invention permits the use of oxygen or nitrogen, or both, as a carrier gas. The oxygen used as a carrier gas can be the same gas used to support combustion.

The actual residence time of the particles in the flame necessary to produce spheroidal particles will vary with the size of the particles. In operating the process of the invention, one needs to find the optimum residence time by adjusting the pressure of the carrier gas and observing the effect on the particles produced. For example, one may begin the process at a relatively high carrier gas pressure, thus producing particles that have not quite become spheroidal. One would then gradually reduce the gas pressure until the output particles have a spheroidal shape. Conversely, one could begin the process at a relatively low carrier gas pressure, which produces particles which tend to clump together and/or form filaments, and one could increase the pressure until the clumping no longer occurs and the particles become spheroidal.

In all cases, one can observe the spheroidal shape by examining the particles with a microscope. One can take samples of particles while the system continues to operate, and can examine them with a microscope. Then, even while the process is operating, one can make small adjustments to optimize the quality of the output particles. Alternatively, one can operate the process in small batches, adjusting the carrier gas pressure for each batch until the output particles have the desired sphericity.

The person skilled in the art will recognize that one can modify the above-described invention in various ways. One should consider such modifications as within the spirit and scope of the following claims.

What is claimed is:

1. A method of making spheroidal glass particles, the method comprising the steps of:
   a) providing a quantity of glass particles in a form of a powder, the powder being composed of particles having an average diameter in a range of about 2–150 microns,
   b) entraining the powder in a carrier gas,
   c) directing the carrier gas and the powder into a chamber which houses a burner, while simultaneously supplying fuel and substantially pure oxygen, through a fuel line and a separate oxygen line, to the burner, and simultaneously injecting the powder and the carrier gas into a flame produced by the burner, wherein the particles become spheroidal while within the flame and do not stay within the flame long enough to melt, and
   d) collecting the particles from the chamber after the particles have become spheroidal,
   wherein the entraining step comprises a step of diverting some oxygen from the oxygen line and using only said diverted oxygen as the carrier gas,
   further comprising the steps of sensing the temperature in the flame, and varying a flow of fuel in the fuel line in response to the sensed flame temperature, and
   further comprising the steps of measuring a flow of fuel in the fuel line, and varying a flow of oxygen in the oxygen line so as to maintain a desired ratio of oxygen to fuel.

2. The method of claim 1, wherein the burner is disposed in a chamber having a bottom, and wherein the collecting step comprises recovering the particles from the bottom of the chamber.

3. The method of claim 1, wherein the burner is disposed in a chamber, and wherein the chamber has a top vent, and wherein the collecting step comprises recovering particles emerging from the top vent.

4. The method of claim 1, further comprising the step of controlling a residence time of the particles in the flame by varying the pressure of the carrier gas, until the particles emerging from the flame are generally spheroidal.

5. The method of claim 1, wherein the method is conducted at a temperature of about 5000° F. or less.

6. The method of claim 1, wherein the flame has a center, and wherein the carrier gas and powder enter the flame near the center of the flame.

7. A method of making spheroidal glass particles, the method comprising the steps of:
   a) providing a quantity of glass particles in a form of a powder, the powder being composed of particles having an average diameter in a range of about 2–150 microns,
   b) entraining the powder in a carrier gas,
   c) directing the carrier gas and the powder into a chamber which houses a burner, while simultaneously supplying fuel and substantially pure oxygen, through a fuel line and a separate oxygen line, to the burner, and simultaneously injecting the powder and the carrier gas into a flame produced by the burner, wherein the particles become spheroidal while within the flame and do not stay within the flame long enough to melt,
   d) collecting the particles from the chamber after the particles have become spheroidal,
   e) sensing the temperature in the flame, and varying a flow of fuel in the fuel line in response to the sensed flame temperature, and
   f) measuring a flow of fuel in the fuel line, and varying a flow of oxygen in the oxygen line so as to maintain a desired ratio of oxygen to fuel.

8. A method of making spheroidal glass particles, the method comprising the steps of entraining particles of glass in a carrier gas, directing the carrier gas and particles into a flame of a burner which is connected to a source of fuel and to a source of substantially pure oxygen, wherein the particles become spheroidal while within the flame, the burner being housed in a chamber, and withdrawing the particles from the chamber, the preceding steps being performed while controlling pressure of the carrier gas so as to control residence time of the particles in the flame, and thereby to control sphericity of the particles emerging from the chamber, wherein the particles do not stay within the flame long enough to melt, and wherein the entraining step comprises the step of diverting some oxygen from the source of oxygen and using only said diverted oxygen as the carrier gas,
   further comprising the steps of sensing the temperature in the flame, and varying a flow of fuel to the burner in response to the sensed flame temperature, and
   further comprising the steps of measuring a flow of fuel to the burner, and varying a flow of oxygen from the oxygen source so as to maintain a desired ratio of oxygen to fuel.

9. A method of making spheroidal glass particles, the method comprising the steps of entraining particles of glass in a carrier gas, directing the carrier gas and particles into a flame of a burner which is connected to a source of fuel and to a source of substantially pure oxygen, wherein the particles become spheroidal while within the flame, the burner being housed in a chamber, and withdrawing the particles from the chamber, the preceding steps being performed while controlling pressure of the carrier gas so as to control residence time of the particles in the flame, and thereby to control sphericity of the particles withdrawn from the chamber, wherein the particles do not stay within the flame long enough to melt,
   further comprising the steps of sensing the temperature in the flame, and varying a flow of fuel to the burner in response to the sensed flame temperature,
   and further comprising the steps of measuring a flow of fuel to the burner, and varying a flow of oxygen from the oxygen source so as to maintain a desired ratio of oxygen to fuel.

10. Apparatus for producing spheroidal glass particles, comprising:
   a) means for directing a carrier gas into a supply of glass particles so as to entrain the particles in the carrier gas,
   b) means defining an oxygen-fuel burner, the burner being connected to a source of fuel and a separate source of oxygen, the burner having a center region,
   c) conduit means for directing the carrier gas and entrained particles into the center region of the burner,
   d) means for withdrawing particles, which have become spheroidal while within the burner, from the burner,
   e) means for sensing the temperature in the burner, and varying a flow of fuel to the burner in response to the sensed burner temperature,
   f) means for measuring a flow of fuel to the burner, and varying a flow of oxygen from the oxygen source so as to maintain a desired ratio of oxygen to fuel.

11. The apparatus of claim 10, wherein the source of oxygen is connected to the means for directing, wherein at least some of the carrier gas comprises oxygen taken from the source of oxygen.

12. A method of making spheroidal glass particles, the method comprising the steps of:

a) providing a quantity of glass particles in a form of a powder, the powder being composed of particles having an average diameter in a range of about 2–150 microns, b) entraining the powder in a carrier gas, c) directing the carrier gas and the powder into a chamber which houses a burner, while simultaneously supplying fuel and substantially pure oxygen, through a fuel line and a separate oxygen line, to the burner, and simultaneously injecting the powder and the carrier gas into a flame produced by the burner, wherein the particles become spheroidal while within the flame and do not stay within the flame long enough to melt, and d) collecting the particles from the chamber after the particles have become spheroidal, wherein at least a portion of the carrier gas comprises oxygen taken from the oxygen line, and further comprising the steps of sensing the temperature in the flame, and varying a flow of fuel in the fuel line in response to the sensed flame temperature, and measuring a flow of fuel in the fuel line, and varying a flow of oxygen in the oxygen line so as to maintain a desired ratio of oxygen to fuel.

13. A method of making spheroidal glass particles, the method comprising the steps of entraining particles of glass in a carrier gas, directing the carrier gas and particles into a flame of a burner which is connected to a source of fuel and to a source of substantially pure oxygen, wherein the particles become spheroidal while within the flame, the burner being housed in a chamber, and withdrawing the particles from the chamber, the preceding steps being performed while controlling pressure of the carrier gas so as to control residence time of the particles in the flame, and thereby to control sphericity of the particles withdrawn from the chamber, wherein the particles do not stay within the flame long enough to melt, and wherein at least a portion of the carrier gas comprises oxygen taken from the source of oxygen, and further comprising the steps of sensing the temperature in the flame, and varying a flow of fuel to the burner in response to the sensed flame temperature, and measuring a flow of fuel to the burner, and varying a flow of oxygen from the oxygen source so as to maintain a desired ratio of oxygen to fuel.

\* \* \* \* \*